United States Patent [19]
Li et al.

[11] Patent Number: 5,829,001
[45] Date of Patent: Oct. 27, 1998

[54] DATABASE UPDATES OVER A NETWORK

[75] Inventors: Kong Li, San Jose; Her-Daw Che, Cupertino; Wei-Jen Chuang, Milpitas; Prayoon Phathayakorn, San Jose; Ching-Fa Hwang, Cupertino, all of Calif.

[73] Assignee: NetIQ Corporation, Santa Clara, Calif.

[21] Appl. No.: 784,593

[22] Filed: Jan. 21, 1997

[51] Int. Cl.$^6$ .................................................... G06F 17/30
[52] U.S. Cl. ................................ 707/10; 707/1; 707/103; 707/201; 395/183.02; 395/182.18
[58] Field of Search ............................. 1/1; 707/10, 103, 707/201, 1; 702/186; 395/182.02, 182.18, 673

[56] References Cited

U.S. PATENT DOCUMENTS

| | | | |
|---|---|---|---|
| 5,490,270 | 2/1996 | Devarakonda et al. | 707/201 |
| 5,506,955 | 4/1996 | Chen et al. | 395/183.02 |
| 5,684,945 | 11/1997 | Chen et al. | 395/182.18 |

Primary Examiner—Thomas G. Black
Assistant Examiner—Diane D. Mizrani
Attorney, Agent, or Firm—Skjerven, Morrill, MacPherson, Franklin & Friel, LLP; Brian D. Ogonowsky

[57] ABSTRACT

The present invention provides an improved method and apparatus for performing database updates in a distributed system having an originating database stored in a server and a partial or complete copy of the database stored in a client. In one embodiment, a database update system includes a server having a database, a network, and a client having a storage and software for accessing the database over the network. The client maintains the last update time of each table stored in its storage. The server maintains the modification time as an integral field of each record in the database. The modification time of a record indicates the last time at which the record was modified in the database. The client software requests copies of all records of a table stored in the client's storage that have a modification time that is later than the last update time of the table. In another embodiment, the server also maintains a modification table that includes a record for each table in the database. Each record in the modification table includes a table modification time that indicates the last time at which any record in the associated table was modified in the database.

22 Claims, 14 Drawing Sheets

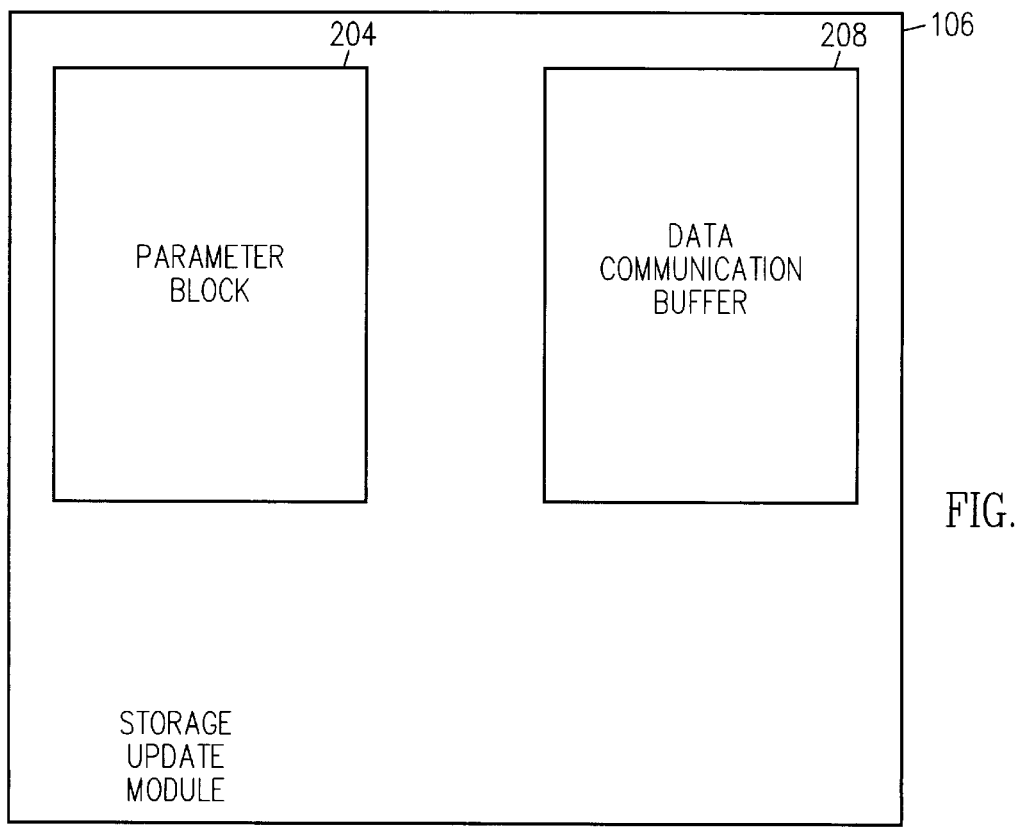

DATABASE UPDATES OVER A NETWORK

BACKGROUND OF THE INVENTION

1. Field of the Invention

The present invention relates generally to a programmed computer and, more particularly, to an improved method and apparatus for performing database updates in a distributed system.

2. Description of Related Art

Computer systems that include databases accessible by a number of users in a virtually simultaneous manner are well known. The client-server model, for example, represents a common paradigm for providing shared access to databases. A client-server system includes a main computer (the "server") in which one or more databases are stored and one or more satellite computers (the "clients") which access the database. The access is generally performed over a network. The clients use portions of the database on an as needed basis.

A server typically includes database management software for accessing the data stored in the database. The database can be stored on any suitable storage device such as a random-access memory ("RAM"), magnetic media, such as tapes and disks, or optical media. Depending on the requirements of the system, the server may be a personal desktop computer that includes a hard-disk and commercially available database management software or a large mainframe computer that includes multiple tape drives and specifically designed database management software.

A client is typically a personal computer, a workstation, or some other kind of computer terminal. The client has a separate storage which is usually smaller than the server storage. The storage typically includes some combination of RAM and hard-disk. The client can be either remote from the server or collocated with the server.

The network typically includes commercial telephone lines, dedicated communication lines, or both, to carry messages between the server and the clients. Sending messages between the server and the clients is costly, not only in terms of the expense of operating the network, but also in terms of time and computer resources. Therefore, it is desirable to minimize the number of messages that flow between the server and the clients over the network.

A client typically includes one or more "applications" such as word processors, spreadsheets, electronic mail, and database interface software that communicate with the server to access information in the database, to update information in the database, and to add new information to the database. Some of the applications are under the control of a human operator. Other applications run automatically or under the control of another application.

Copying a portion of the data objects stored in the server into the client's storage reduces the demand on the server and also reduces network traffic. Data objects in the client's storage are accessed by the client applications without having to send a message to the server each time the data objects are needed.

A protocol between the client and the server ensures that the data objects stored in the client's storage are current with the corresponding data objects in the database. Thus, the client's storage is periodically updated to ensure that information stored in the client's storage accurately reflects the information stored in the server.

Prior approaches to performing database updates over a network allow a client application to be informed of changes made either by other applications or by other users to data objects in the database that correspond to the data objects stored in the client's storage. One such prior approach requires that the server perform an active role in updating each client's storage. In particular, this approach requires that the server keep track of the state of each client such as when a client most recently updated its storage, whether a client is connected over the network, and whether a client is ready to receive a storage update. As a result, every database transaction incurs significant overhead to support a detection and notification service that often is not needed for the transaction. Therefore, this approach creates additional complexities and degrades the performance of both the server and the network.

Another approach eliminates the need for the server having to take an active role in performing database updates over a network. However, this approach typically requires that the server maintain a log of all modifications made to the database. A client's storage is updated by scanning the log for data objects that were modified since the last time that the client's storage was updated. Thus, this approach creates additional complexities as the server must maintain additional information in a log. Moreover, this approach significantly increases the overhead associated with database transactions that involve modifying data objects stored in the server.

It will be apparent from the foregoing that there remains a need for an efficient approach for performing database updates over a network.

SUMMARY

The present invention provides an improved method and apparatus for performing database updates in a distributed system having an originating database stored in a server and a partial or complete copy of the database stored in a client.

In one embodiment, a database update system includes a server having a database, a network, and a client having a storage and software for accessing the database over the network. Each client maintains the last update time of each set of data objects stored in its storage. The server maintains the modification time of each data object in the database as an integral value of the data object. The modification time of a data object indicates the last time at which the data object was modified in the database. The client software requests copies of all data objects of a set of data objects stored in the client's storage that have a modification time that is later than the last update time of the set of data objects.

In another embodiment, a set of data objects, corresponds to a table in a relational database, and a data object corresponds to a record in a relational database.

In yet another embodiment, the server also maintains a modification table that includes a record for each table in the database. Each record in the modification table includes a table modification time that indicates the last time at which any record in the associated table was modified in the database. Before scanning a table for all records with a modification time later than the last update time of the table, the server determines whether the last update time of the table is later than the table modification time. Thus, this embodiment eliminates the expensive operation of scanning the entire table for modified records when no record in the table has been modified since the last update time of the table.

Other aspects and advantages of the present invention will become apparent from the following detailed description and accompanying drawings.

BRIEF DESCRIPTION OF THE DRAWINGS

FIG. 6 shows a table of the database of FIG. 4 in accordance with one embodiment of the present invention.

FIG. 7 shows a storage update module of the client of FIG. 3 in accordance with one embodiment of the present invention.

FIG. 12 is a key to FIGS. 12A–12B.

DETAILED DESCRIPTION OF THE PREFERRED EMBODIMENTS

The present invention provides an improved method and apparatus for performing database updates over a network. In particular, client applications that frequently need to access information maintained in a database stored in a server would significantly benefit from this improved method and apparatus.

For example, a system management application typically runs on a client and accesses a server that maintains system information such as network information, device information, job information, and event information. This information often must be made available to many users of the system management application. Moreover, the system management application typically must have access to current information so that the users can view data that accurately reflects the current state of the system.

Figure 1:
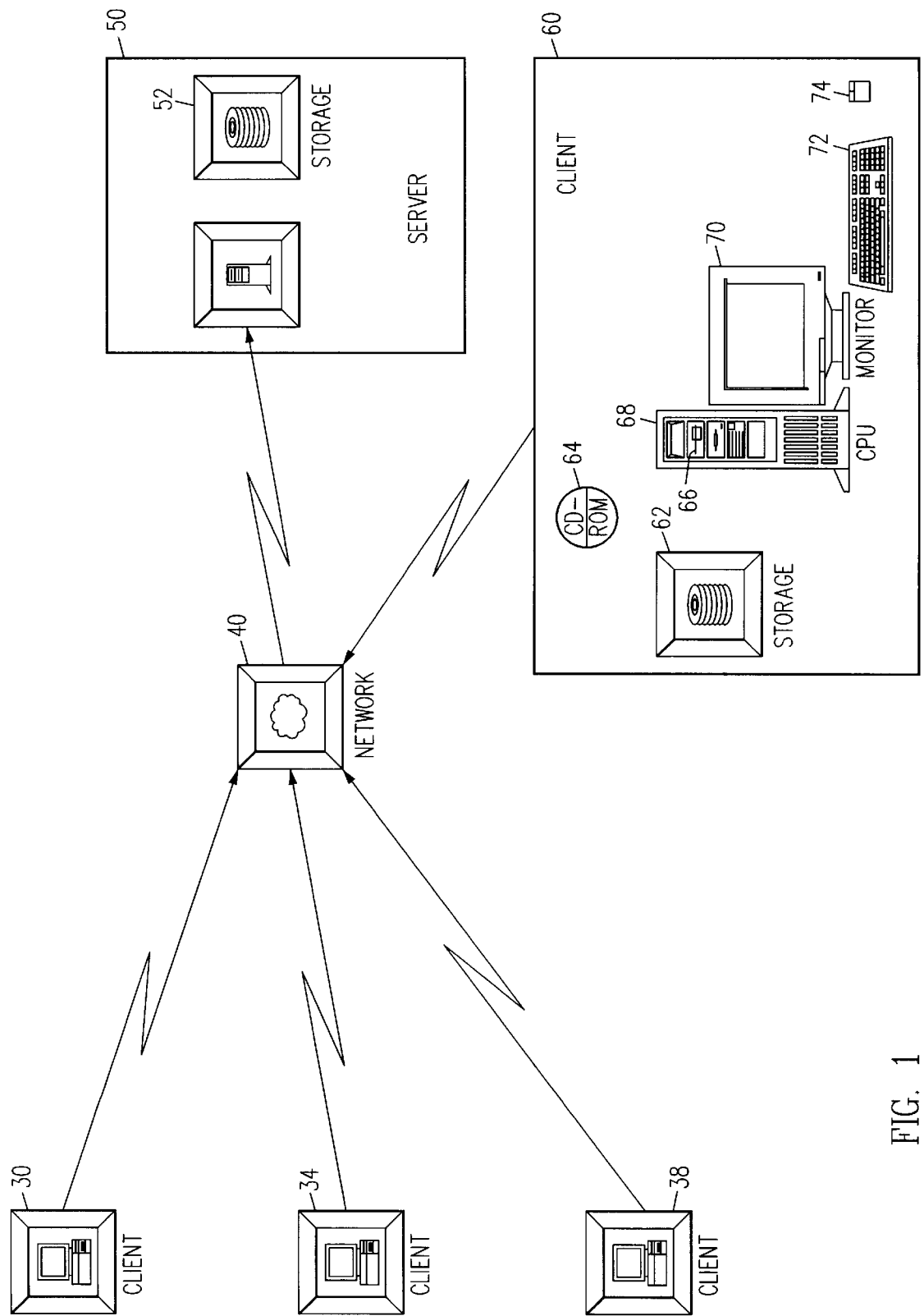
FIG. 1 shows a schematic representation of a client-server computer database system having a server and multiple clients according to one embodiment of the present invention.

FIG. 1 shows a typical client-server computer database system according to one embodiment of the present invention. A centrally located server 50 includes a database stored in server storage such as magnetic storage unit 52. Other parts of server 50 such as a central processor unit, input and output devices, software, and the like are not shown but are known to those skilled in the art.

Multiple clients 30, 34, 38, and 60 are linked to the server 50 by network 40. Network 40 typically includes commercial telephone circuits, dedicated circuits, a local area network, and the like.

Client 60 includes such items as mouse 74, keyboard 72, monitor 70, and processor unit 68. Client 60 also includes client storage such as magnetic storage unit 62. Processor unit 68 includes CD-ROM drive 66 for loading CD-ROM 64. The functioning of these components is known to those skilled in the art and will not be discussed further herein. CD-ROM 64 can include software in accordance with one embodiment of the present invention.

Clients 30, 34, and 38 may have similar or different configurations than client 60. Other clients (not shown) may be included as desired. In addition, clients may be collocated with the server or located at remote locations.

In the embodiment of the invention to be described, it is assumed that all data objects of the database are stored in server storage such as magnetic storage unit 52 and that one or more of the clients stores copies of data objects of a database in local storage such as storage unit 62. However, it will be apparent to those skilled in the art that the invention is not limited to a database system configured in this manner. For example, the database may be distributed among more than one location instead of being stored in the same physical location. In addition, the term "object" is intended to refer either to a data object or to some other kind of data item depending on the kind of database system in which the invention is embodied.

Figure 2:
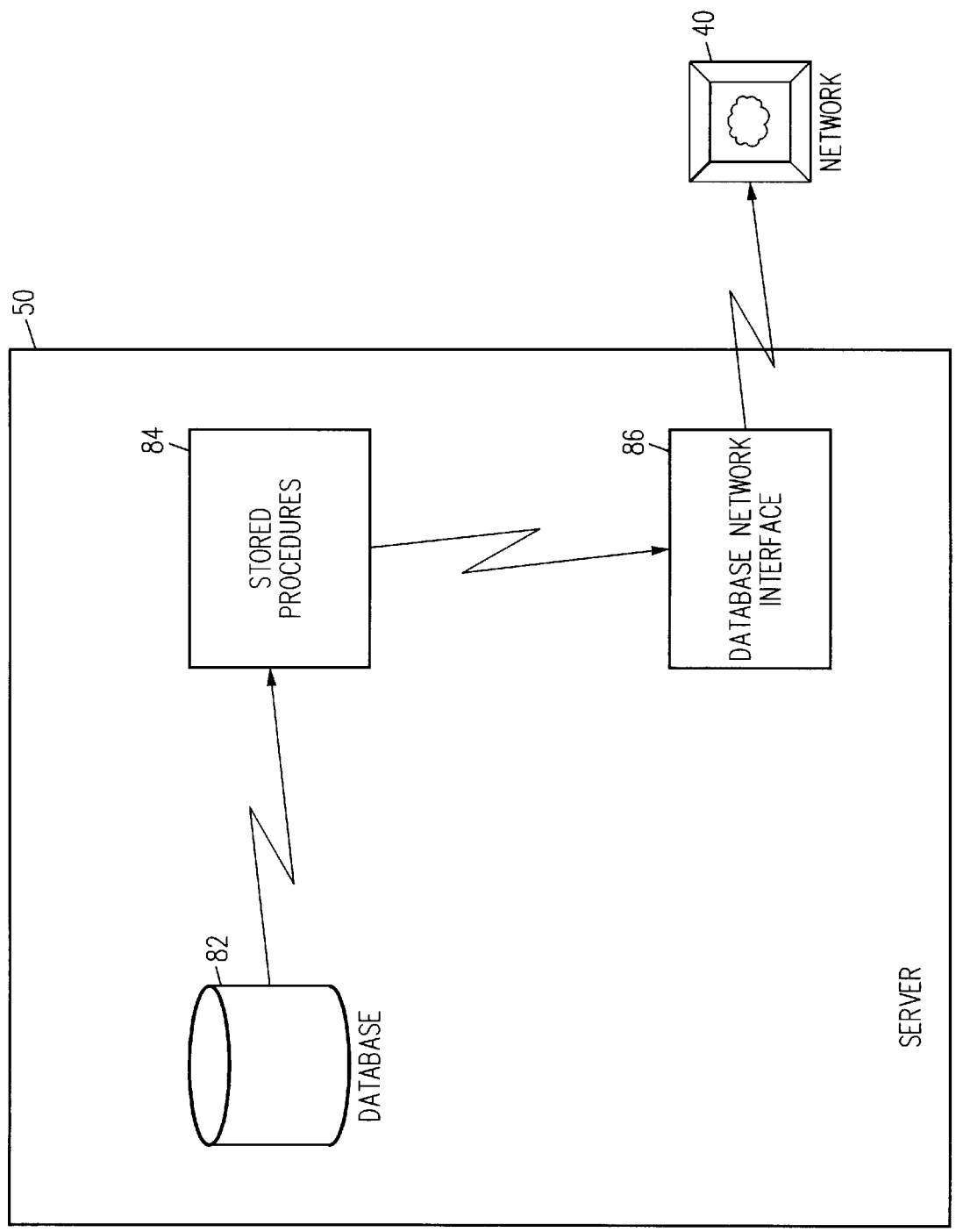
FIG. 2 shows a server in accordance with one embodiment of the present invention.

FIG. 2 shows server 50 in greater detail. Database 82 is stored in server 50.

Database 82 may be, for example, a relational database. Relational database systems represent a type of commercial data management technology. In a relational database, data relationships are modeled to be relatively simplistic in that all data is organized as though it were formatted into tables with the table columns representing the table's fields and the table rows, or records, representing the values of the table's fields. Thus, in a relational database, each record represents a data object, and a table represents a set of data objects. Although data is logically organized in tables, data is not necessarily physically stored in tables. Further, the relational database user does not need to know how the database is physically constructed and can access and update data via a query-language interface. The Structured Query Language (SQL) is the preferred language medium for composing queries to a relational database. For example, Microsoft™ SQL is a commercially available relational database system.

Server 50 further includes stored procedures 84. A client application may access database 82 by invoking stored procedures 84. In particular, stored procedures 84 typically perform various operations such as connecting to the database or providing read/write access to the database. For example, a client application may invoke stored procedures 84 to access database 82 and retrieve particular data objects from database 82 for processing on the client. Commercial database management software such as Microsoft™ SQL typically include a mechanism for stored procedures.

Server 50 communicates with its clients over network 40 through database network interface 86. Open Database Connect (ODBC) is the preferred database network interface for accessing a database over a network. For example, Microsoft™ ODBC is a commercially available database network interface.

Figure 3:
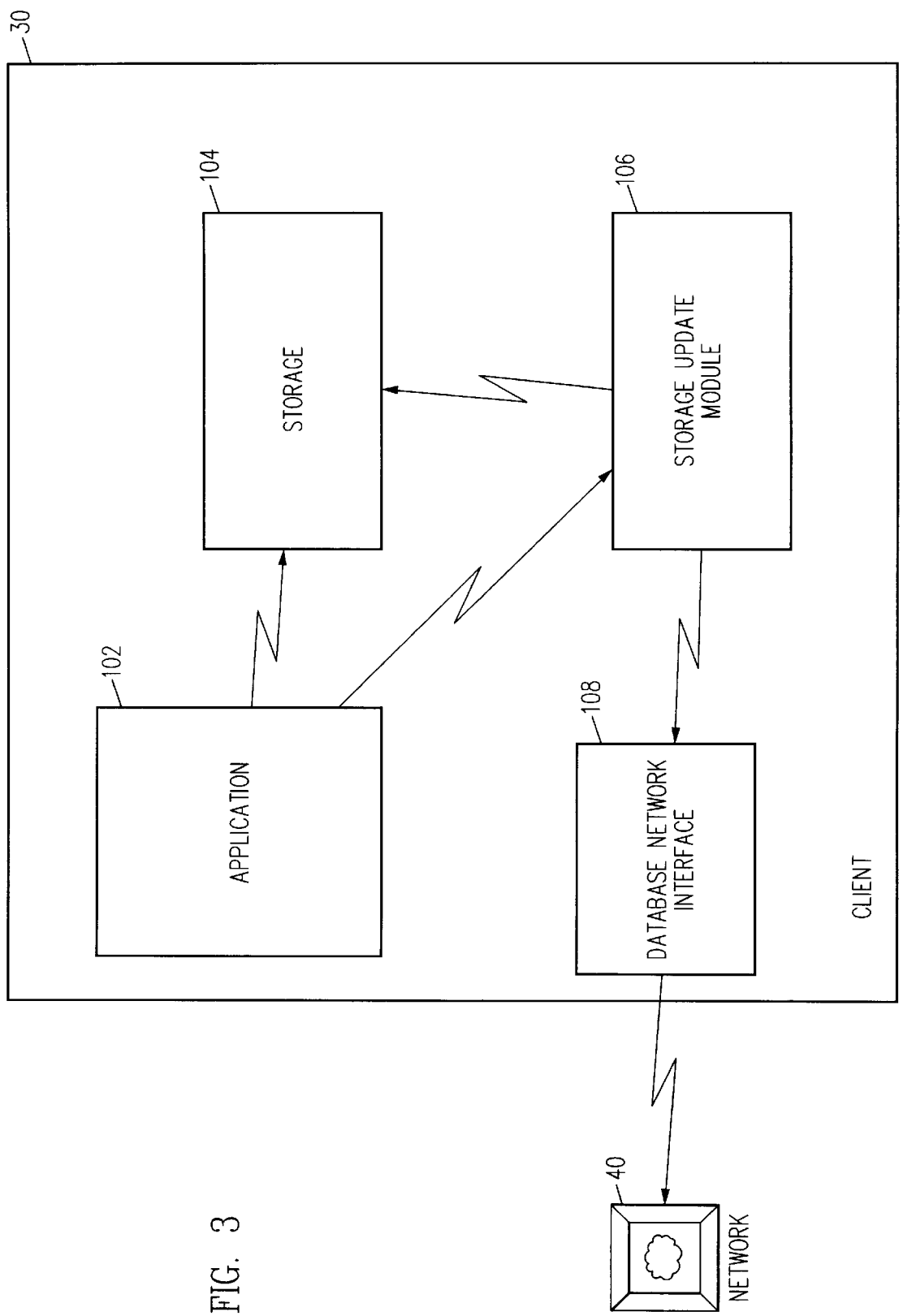
FIG. 3 shows a client in accordance with one embodiment of the present invention.

FIG. 3 shows client 30 in greater detail. Client 30 includes storage 104. Client 30 also includes application 102 that communicates with storage 104. Application 102 accesses data objects stored in storage 104 when such data objects are needed by the application.

Client 30 communicates with server 50 (FIG. 2) over network 40 through database network interface 108. Database network interface 108 represents a database network interface that is compatible with database network interface 86 (FIG. 2).

Storage update module 106 invokes stored procedures 84 (FIG. 2) which access database 82 (FIG. 2) over network 40 and return particular data objects of the database to client 30 for processing by the application. Storage 104 may then include copies of such data objects of database 82 (FIG. 2). For example, client 30 may store data objects of database 82 in storage 104 that are frequently accessed by application 102. Storage update module 106 updates storage 104 to ensure that the data objects stored in storage 104 accurately reflect the corresponding data objects in database 82 (FIG. 2).

Figure 4:
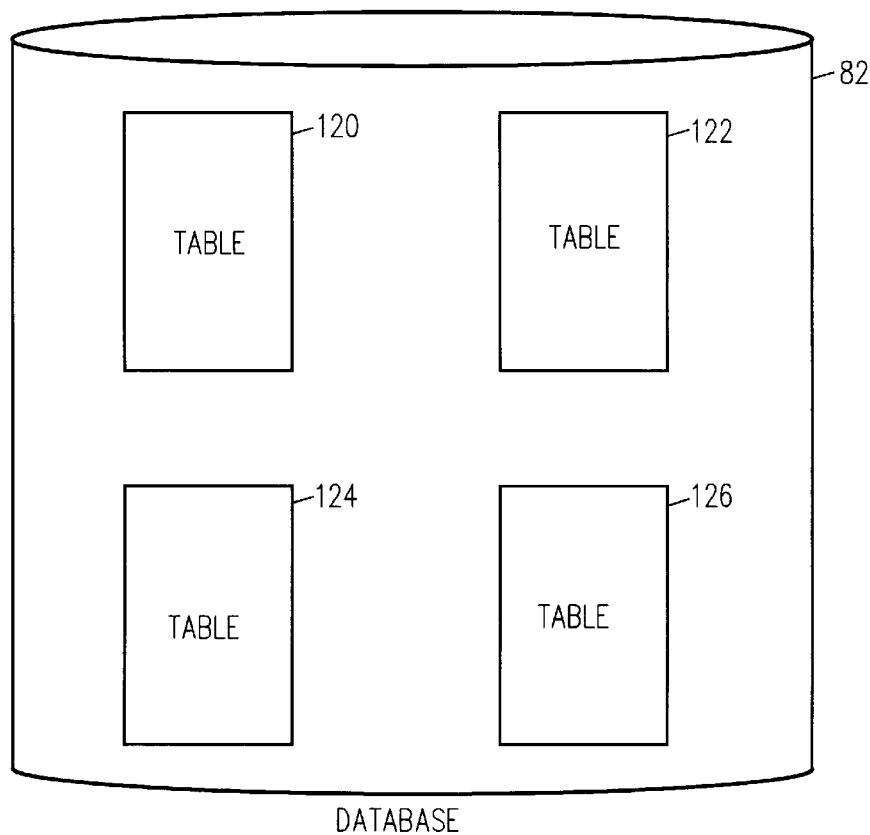
FIG. 4 shows a database of the server of FIG. 2 in accordance with one embodiment of the present invention.

FIG. 4 shows database 82 of server 50 (FIG. 2) in greater detail. Reference numerals 120, 122, 124, and 126 indicate tables of database 82.

Figure 5:
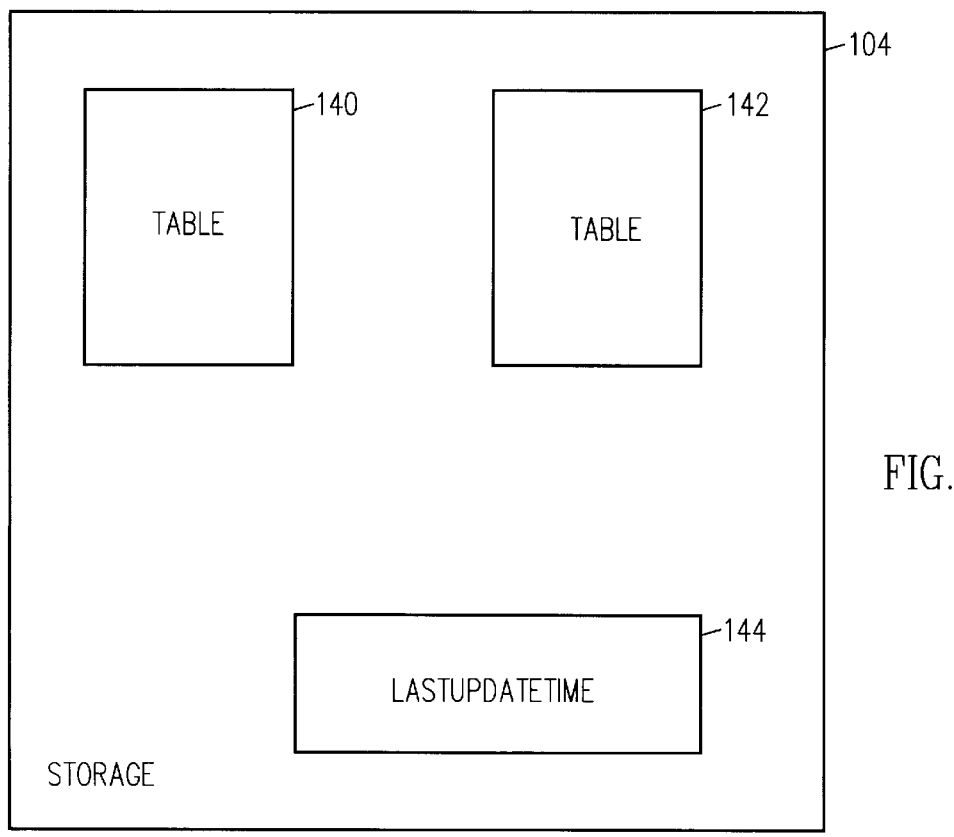
FIG. 5 shows a storage of the client of FIG. 3 in accordance with one embodiment of the present invention.

FIG. 5 shows storage 104 of client 30 (FIG. 3) in greater detail. Storage 104 includes tables 140 and 142. Storage 104 also includes LastUpdateTime 144. A client's LastUpdateTime indicates the last time at which any data object in the client's storage was updated. Thus, LastUpdateTime 144 indicates the last time at which any record of table 140 or table 142 was updated in storage 104.

Thus, the server is not required to maintain the update status of each client. The LastUpdateTime is presented by each client upon an update request to the server. The LastUpdateTime is then used by the server to retrieve data objects that have been modified after such time. For example, table 140 represents a copy of table 120 (FIG. 4) as of LastUpdateTime 144, and table 142 represents a copy of table 122 (FIG. 4) as of LastUpdateTime 144. LastUpdateTime 144 is initially set to a predefined value such as zero.

FIG. 6 shows table 120 of database 82 (FIG. 4) in greater detail. Table 120 includes records 160 and 168. Table 120 includes fields for an identifier for each record ("RecordID"), and a time stamp that indicates the last time each record was modified ("ModTime") in database 82 (FIG. 4). Accordingly, the server maintains the ModTime as an integral field of each record in database 82 (FIG. 4). Thus, record 160 includes record-ID 162 and ModTime 164. ModTime 164 represents the last time that any field of record 160 was modified in database 82 (FIG. 4). If record 160 has not been modified since it was added to database 82 (FIG. 4) then ModTime 164 represents the time at which record 160 was added to database 82 (FIG. 4).

Storage update module 106 (FIG. 3) updates storage 104 (FIG. 5) using the ModTime of each record. For example, in one embodiment, storage update module 106 (FIG. 3) updates tables 140 and 142 of storage 104 (FIG. 5) by requesting records from database 82 (FIG. 2) that have an associated ModTime that is later than LastUpdateTime 144 (FIG. 5).

This operation can be implemented in SQL as follows:

select * from Table A where ModTime greater than LastUpdateTime

The above SQL statement retrieves all records of Table A that have a ModTime greater than (i.e., later than) the LastUpdateTime. Stored procedures 84 (FIG. 2) including the above SQL statement retrieve the appropriate records from database 82 (FIG. 2) and return such records to client 30 (FIG. 3).

Record 160 also includes a field for Deleted flag 186. Deleted flag 186 represents a status field for indicating whether record 160 has been deleted from table 120. For example, when record 160 is deleted, the server sets Deleted flag 186 to a predefined value and adjusts ModTime 164 to reflect the time at which record 160 was deleted from table 120.

FIG. 7 shows storage update module 106 of FIG. 3 in greater detail. Storage update module 106 includes data communication buffer 208. Storage update module 106 also includes parameter block 204. Parameter block 204 provides parameters necessary for storage update module 106 to update storage 104 (FIG. 3).

In one embodiment, parameter block 204 includes parameters representing LastUpdateTime 144 (FIG. 5) and the number of records that can be stored in data communication buffer 208. Storage update module 106 provides the parameters in parameter block 204 to the server when the storage update module requests an update from the server. The updated records returned by the server are buffered in data communication buffer 208.

Storage update module 106 can be implemented, for example, in a standard programming language such as "C" or "C++". The C programming language is described in "The C Programming Language" by Brian W. Kernighan and Dennis M. Ritchie (Englewood Cliffs, N.J.: Prentice-Hall, Inc. 1978), and the C++ programming language is described in "Programming in C++" by Stephen C. Dewhurst and Kathy T. Stark (Englewood Cliffs, N.J.: Prentice-Hall, Inc. 1989), which are herein incorporated by reference in their entirety.

Figure 8:
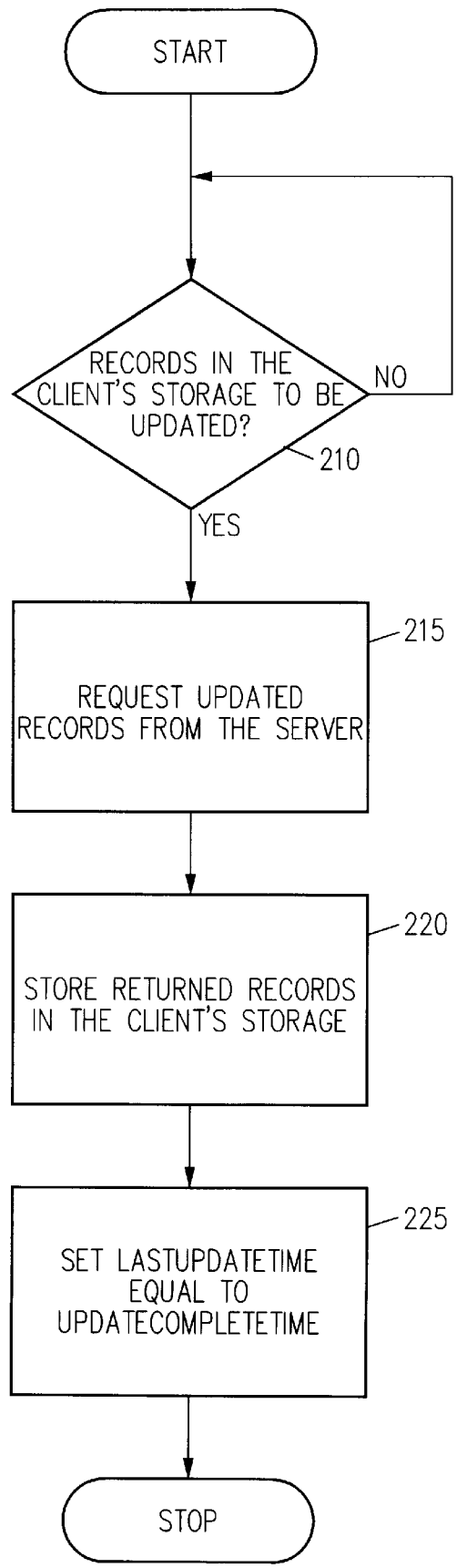
FIG. 8 is a flow diagram illustrating the operation of updating the storage of a client in accordance with one embodiment of the present invention.

FIG. 8 is a flow diagram illustrating the operation of updating the storage of a client according to one embodiment of the present invention. Reference numeral 210 refers to a first stage in this embodiment. In storage 210, the client determines whether any of the records stored in the client's storage need to be updated, in which case the client provides the last update time to the server when the client requests an update from the server in stage 215; otherwise stage 210 is repeated until there are records that need to be updated. In stage 220, the client stores the updated records returned by the server in the client's storage.

In stage 225, the client sets the LastUpdateTime equal to the UpdateCompleteTime which represents the time value returned by the server. For example, in one embodiment, the client invokes stored procedures to request updated records. The stored procedures return the updated records along with the UpdateCompleteTime. At this point, the client's storage includes data objects that represent an accurate copy of the corresponding data objects stored in the server as of the LastUpdateTime.

Figure 9:
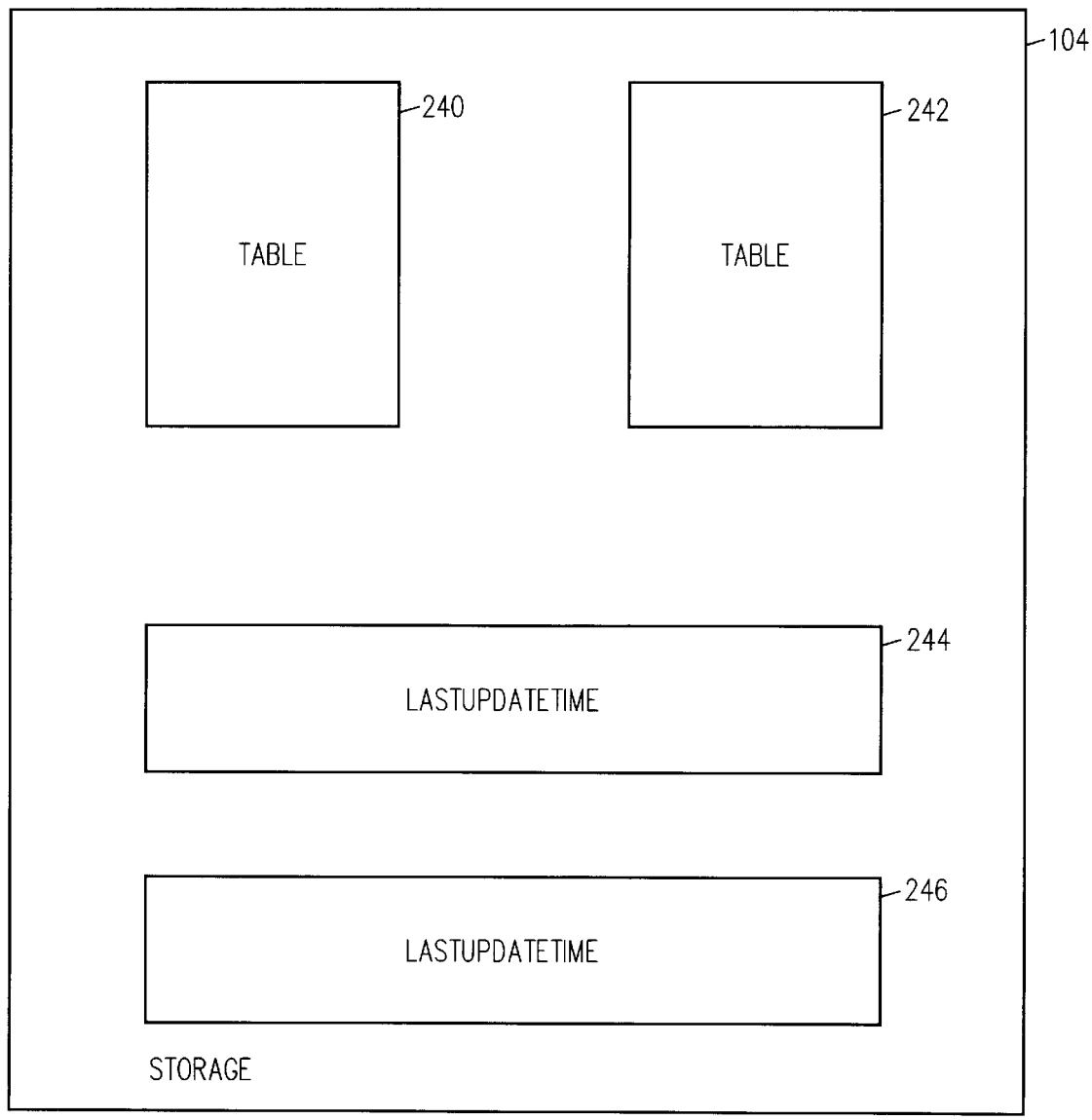
FIG. 9 shows a storage of the client of FIG. 3 in accordance with another embodiment of the present invention.

FIG. 9 shows another embodiment of storage 104 of FIG. 3. Storage 104 includes tables 240 and 242. Storage 104 also includes a LastUpdateTime for each table in the storage so that each table can be updated separately. Thus, storage 104 includes LastUpdateTime 244 for table 240 and LastUpdateTime 246 for table 242.

Figure 10:
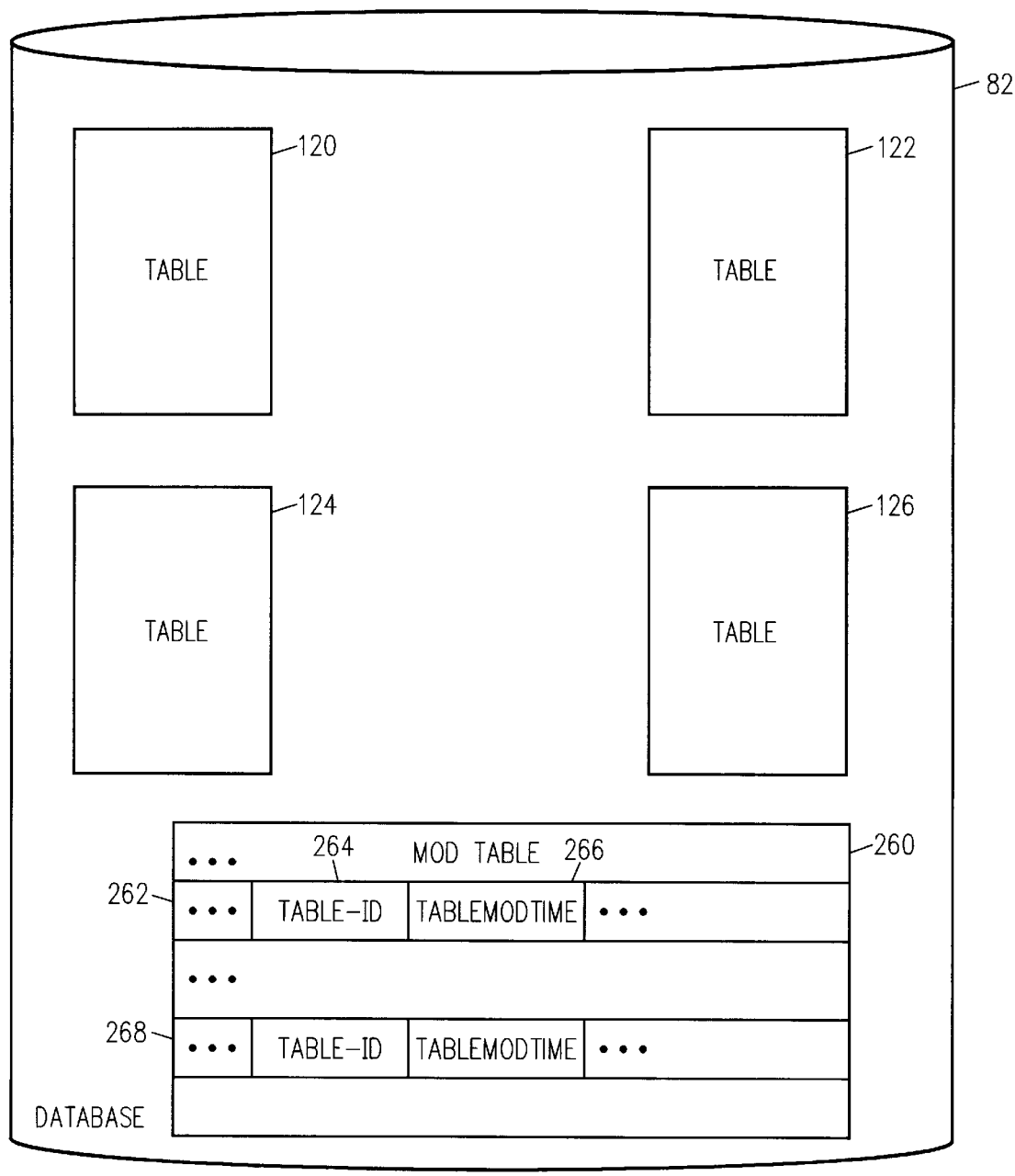
FIG. 10 shows a database of the server of FIG. 2 in accordance with another embodiment of the present invention.

FIG. 10 shows another embodiment of database 82 of server 50 (FIG. 2). Database 82 includes tables 120, 122, 124, and 126. Database 82 also includes an additional table, Mod Table 260. Mod Table 260 includes records 262 and 268. As shown in FIG. 10, each record includes a field for a table identifier ("Table-ID") and a field for a time value indicating the last time at which any record in the table identified by Table-ID was modified ("TableModTime"). Thus, record 262 includes a Table-ID 264 and a TableModTime 266. TableModTime 266 represents the last time that any record in the table identified by Table-ID 264 was modified in database 82.

In one embodiment, Mod Table 260 includes a record for each table of database 82. This embodiment allows the server to efficiently determine whether any record in a table of database 82 has been modified since the LastUpdateTime provided by the client. Accordingly, this embodiment eliminates the expensive operation of scanning the entire table for modified records when none of the table's records have been modified since the LastUpdateTime of the table. For example, in one embodiment, the stored procedure responsible for fetching an update for the table identified by Table-ID 264 first examines Mod Table 260 to determine whether any of the table's records have been modified since the LastUpdateTime (i.e., whether TableModTime 266 is greater than the LastUpdateTime of the table).

Figure 11:
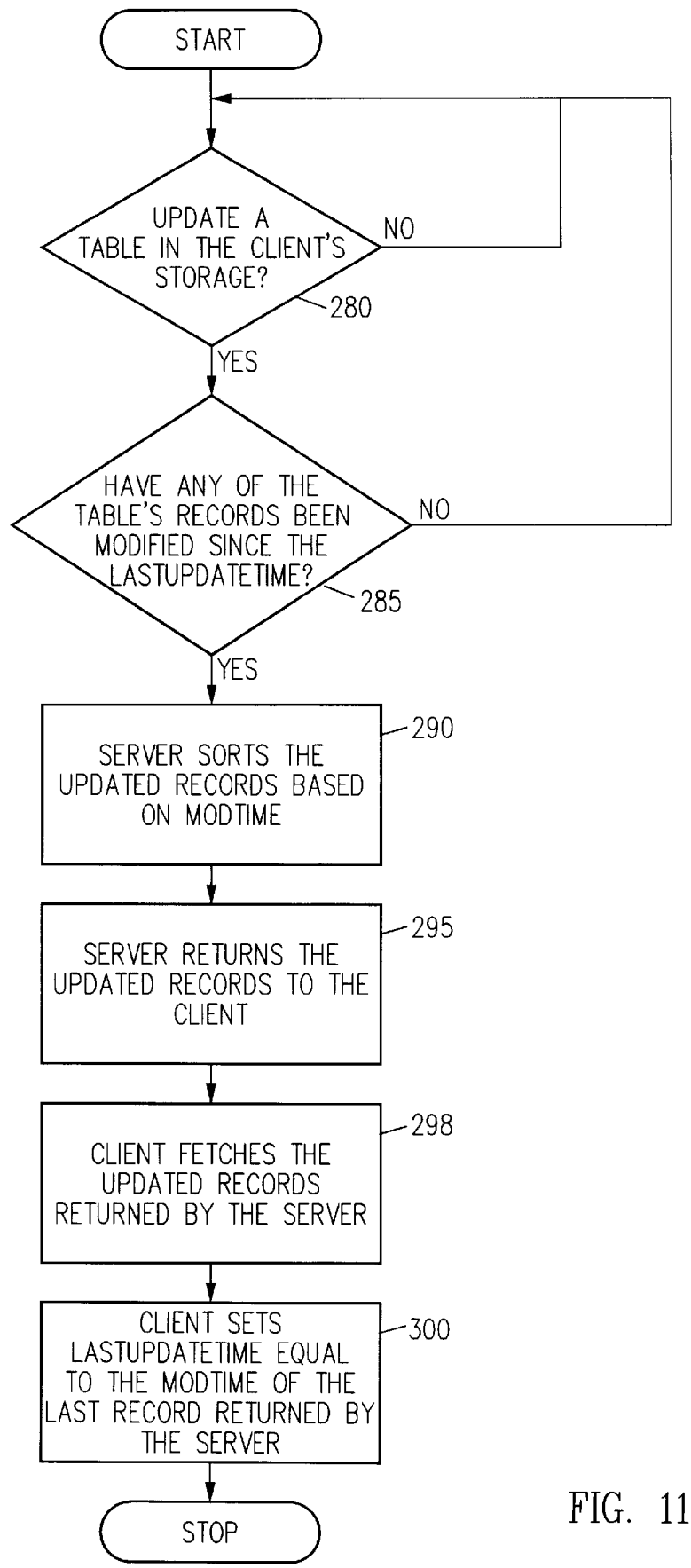
FIG. 11 is a flow diagram illustrating the operation of updating the storage of a client in accordance with another embodiment of the present invention.

FIG. 11 is a flow diagram illustrating the operation of updating a client's storage according to another embodiment. Reference numeral 280 refers to a first stage in this embodiment. In stage 280, the client determines whether any table stored in the client's storage needs to be updated, in which case the client requests an update from the server based on the LastUpdateTime of the table provided by the client, and the server then determines whether any of the table's records have been modified since the LastUpdateTime of the table in stage 285; otherwise stage 280 is repeated until there is a table that needs to be updated. If any of the table's records have been modified since the LastUpdateTime then the server retrieves the updated records and sorts the updated records based on ModTime in stage 290. The server then returns the updated records in stage 295.

In one embodiment, stages 290 and 295 can be implemented in standard SQL syntax as follows:

select * from Table A where ModTime greater than LastUpdateTime of Table A and order by ModTime.

The above SQL statement retrieves records of Table A modified after the LastUpdateTime of Table A and sorts the retrieved records based on ModTime. Thus, the last record returned by the above SQL statement represents the record of Table A with the greatest ModTime (i.e., the most recently modified record of Table A).

In stage 298, the client fetches the updated records returned by the server. In stage 300, the client sets the LastUpdateTime of the table equal to the ModTime of the last record returned by the server. At this point, the table stored in the client's storage includes records that represent an accurate copy of the corresponding records stored in the server as of the LastUpdateTime of the table.

Figure 12A:
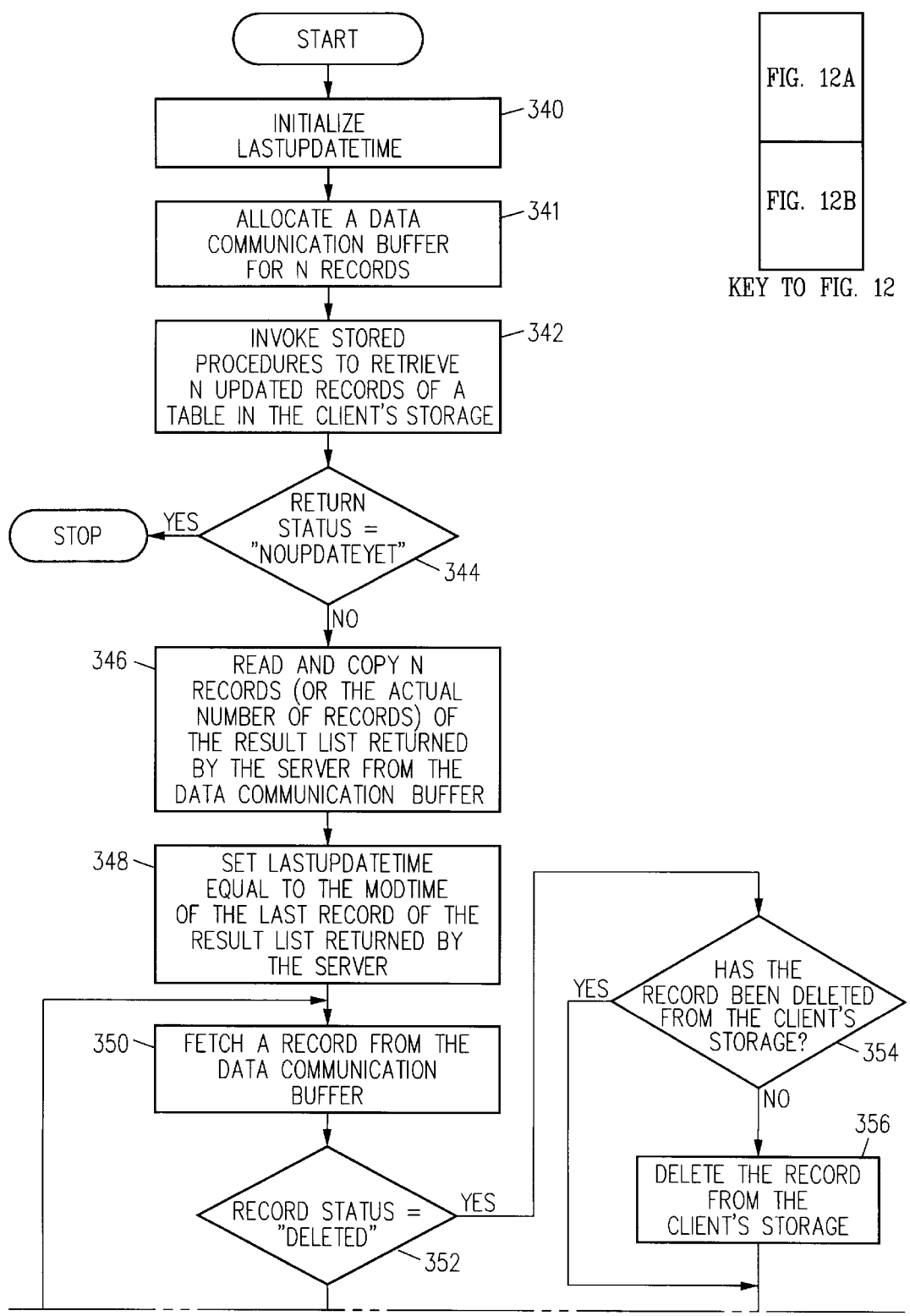
FIGS. 12A–12B are a flow diagram illustrating the operation of updating the storage of a client in accordance with another embodiment of the present invention.
Figure 12B:
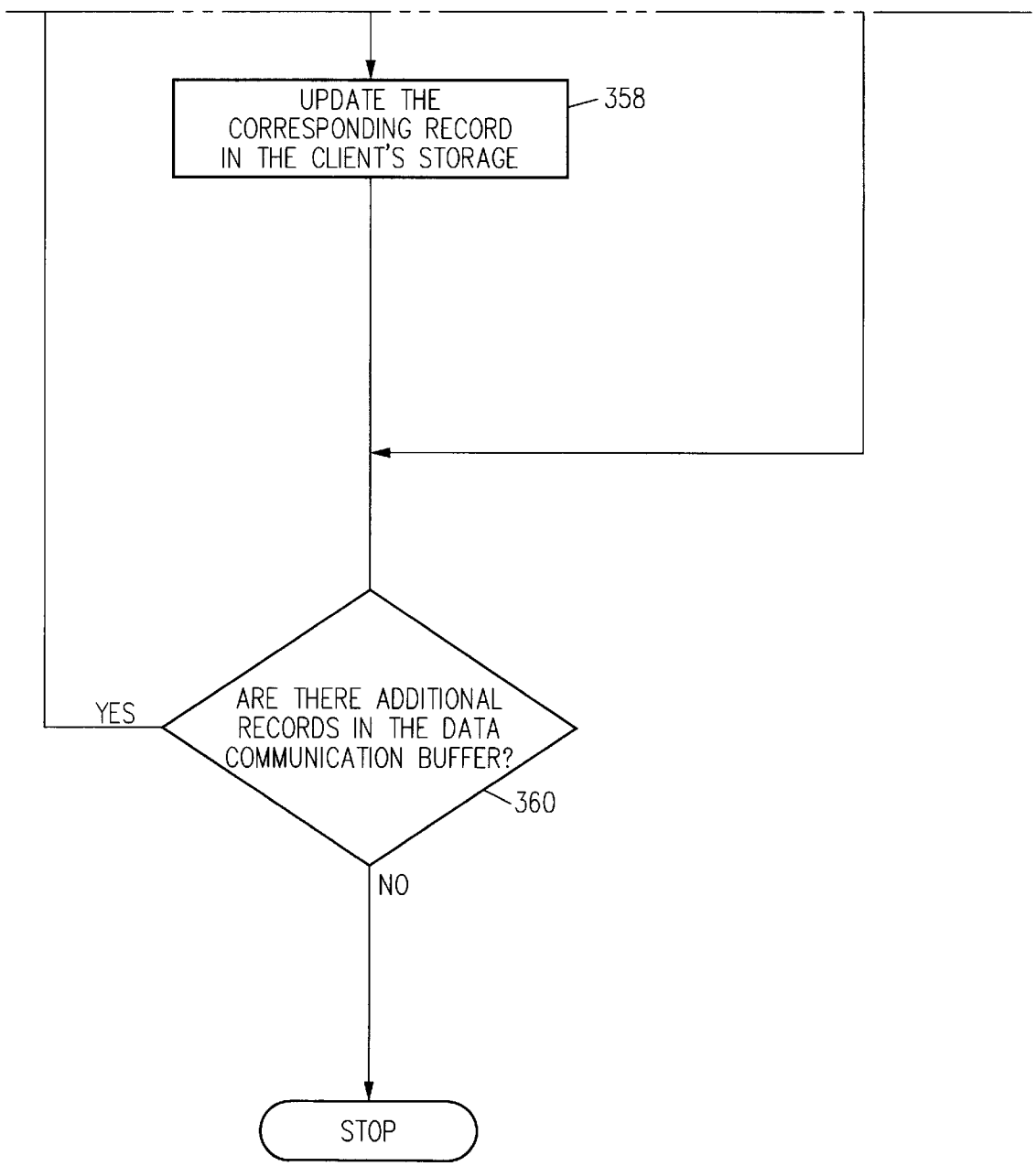

FIG. 12 is a key to FIGS. 12A–12B. FIGS. 12A–12B are a flow diagram illustrating the operation of updating a client's storage in accordance with another embodiment. Referring to FIG. 12A, reference numeral 340 refers to a first stage in this embodiment. The client performs stage 340 only when a table is initially stored in the client's storage. In stage 340, the client initiates the LastUpdateTime of a table to some predefined value such as zero.

In stage 341, the client allocates a data communication buffer for N records. In stage 342, the client invokes stored procedures on the server to retrieve N updated records of a table in the client's storage. In particular, the client may provide various parameters to the server such as a table identifier, the LastUpdateTime of the table, and the maximum number of records that can be stored in the data communication buffer. Stage 344 determines whether the server returned the status of NoUpdateYet, in which case the client terminates the table update; otherwise the client reads and copies the N records (or the actual number of records) of the result list returned by the server from the data communication buffer in stage 346.

In stage 348, the client sets the LastUpdateTime of the table equal to the ModTime of the last record in the result list returned by the server. The client then fetches a record from the data communication buffer in stage 350. Stage 352 determines whether the record has a status of Deleted, in which case the client proceeds to stage 354; otherwise, referring to FIG. 12B, the client updates the corresponding record in the client's storage accordingly in stage 358. Referring to FIG. 12A, stage 354 determines whether the record has been deleted from the client's storage, in which case the client bypasses stage 356; otherwise the client deletes the record from the client's storage in stage 356.

Referring to FIG. 12B, stage 360 determines whether there are any additional records in the data communication buffer, in which case the client returns to stage 350. Otherwise, the client terminates the table update. At this point, the client's storage includes records of the table that represent accurate copies of corresponding records stored in the server as of the LastUpdateTime of the table.

Figure 13:
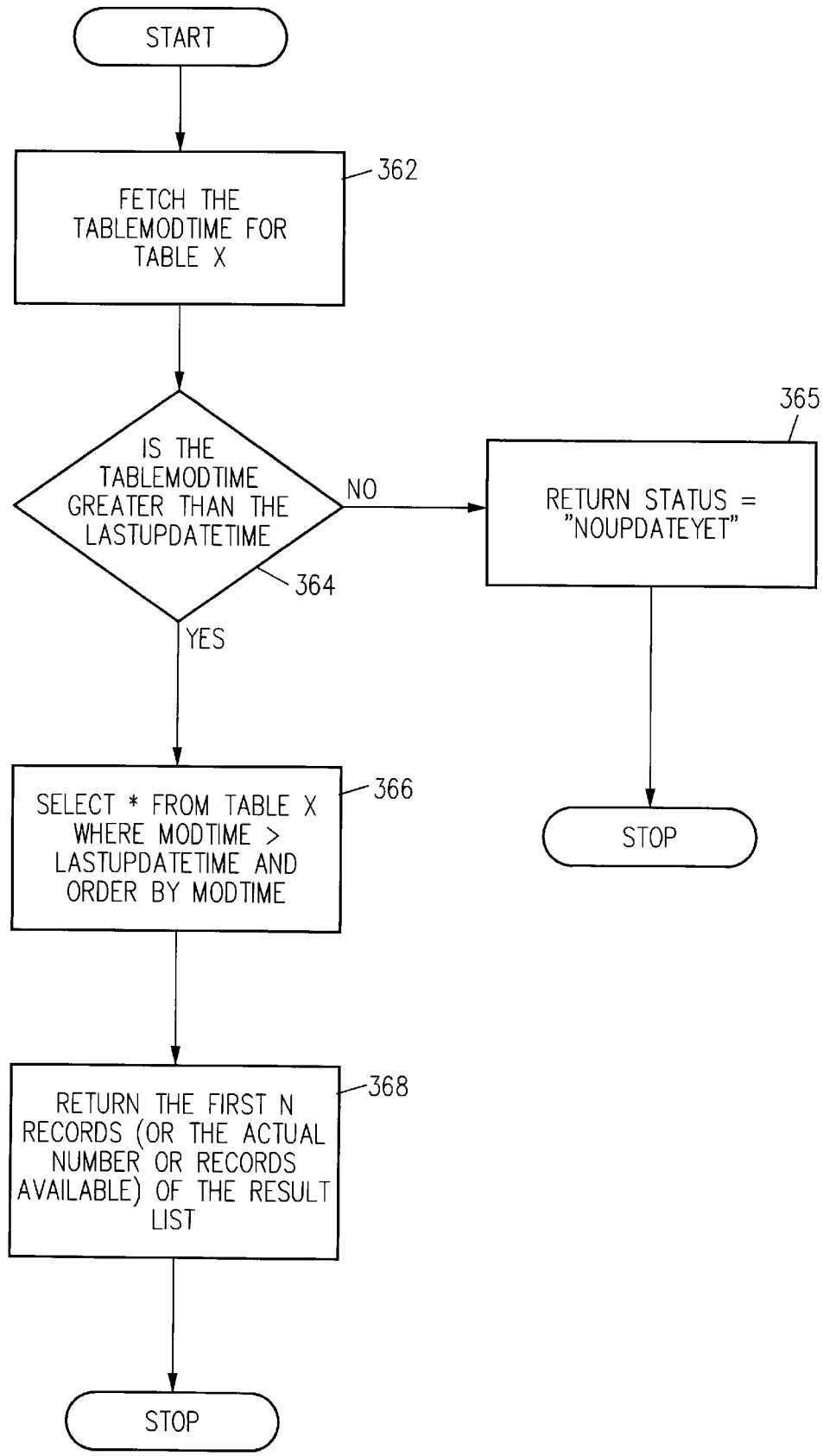
FIG. 13 is a flow diagram illustrating the operation of the server during a database update of a client in accordance with one embodiment of the present invention.

FIG. 13 is a flow diagram illustrating the operation of the server as performed by the stored procedures during a database update of a client in accordance with one embodiment of the present invention (the operation of the client is shown in FIGS. 12A and 12B). In particular, FIG. 13 illustrates the stages of the server during an update of Table X which is stored in client storage. Table X is provided by the client requesting an update of its storage. Reference numeral 362 refers to a first stage in this embodiment. In stage 362, the server fetches the TableModTime for Table X from the Mod Table. Stage 364 determines whether the TableModTime is greater than the LastUpdateTime provided by the client, in which case the server proceeds to stage 366; otherwise the server returns the status of NoUpdateYet to the client in stage 365.

In stage 366, the server retrieves all records in Table X that have been modified since the LastUpdateTime and sorts the records based on ModTime (i.e., the most recently modified record would be last in the result list). As shown in FIG. 13, stage 366 can be implemented in SQL. In stage 368, the server returns the first N records (or the actual number of records available) of the result list to the client (where N is a value provided by the client as shown in FIG. 12A)

Figure 14:
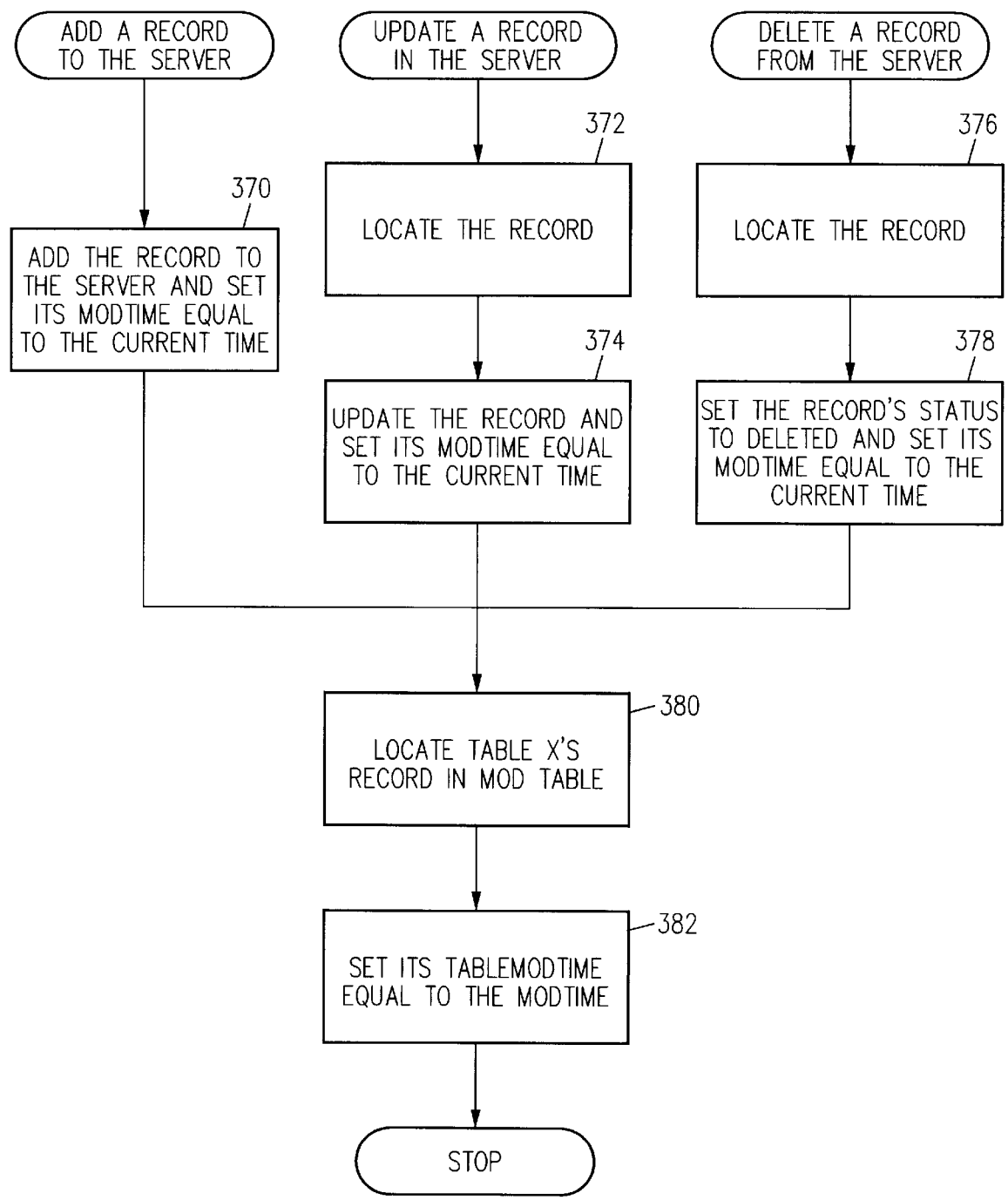
FIG. 14 is a flow diagram illustrating the operation of modifying the database stored in a server in accordance with one embodiment of the present invention.

FIG. 14 is a flow diagram illustrating the operation of modifying records of the database stored in a server in accordance with one embodiment of the present invention. In particular, FIG. 14 illustrates the stages of the server during an addition of a new record to the database stored in the server, an update of an existing record in the database stored in the server, and a deletion of an existing record from the database stored in the server.

In stage 370, the server adds a record to the database stored in the server and sets the record's ModTime equal to the current time. The server then proceeds to stage 380.

In stage 372, the server locates an existing record in the database stored in the server. The server then updates the record and sets the record's ModTime equal to the current time in stage 374. The server then proceeds to stage 380.

In stage 376, the server locates an existing record in the server. The server then sets the record's status to Deleted flag and sets the record's ModTime equal to the current time in stage 378. The server then proceeds to stage 380.

In stage 380, the server locates the record in the Mod table that has a Table-ID that identifies Table X (assuming that the record that was modified in a preceding stage resides in Table X). In stage 382, the server sets the TableModTime of the located record in Mod table equal to the ModTime as set in stage 370, 374, or 378.

The method of the present invention can be used as part of a system management system. A system management system is a system which allows an operator, or even a lay user, to monitor and maintain a computer system. For example, a system management system allows the operator to check the amount of disk space available on the disk drives connected to the system and take appropriate action when the amount of disk space is limited (such as send a message to the users to delete unnecessary files or launch a program designed specifically to correct the problem). A system management system also monitors the various subsystems such as database servers, e-mail servers, and network servers, and monitors the performance of each of the subsystems.

Figure 15:
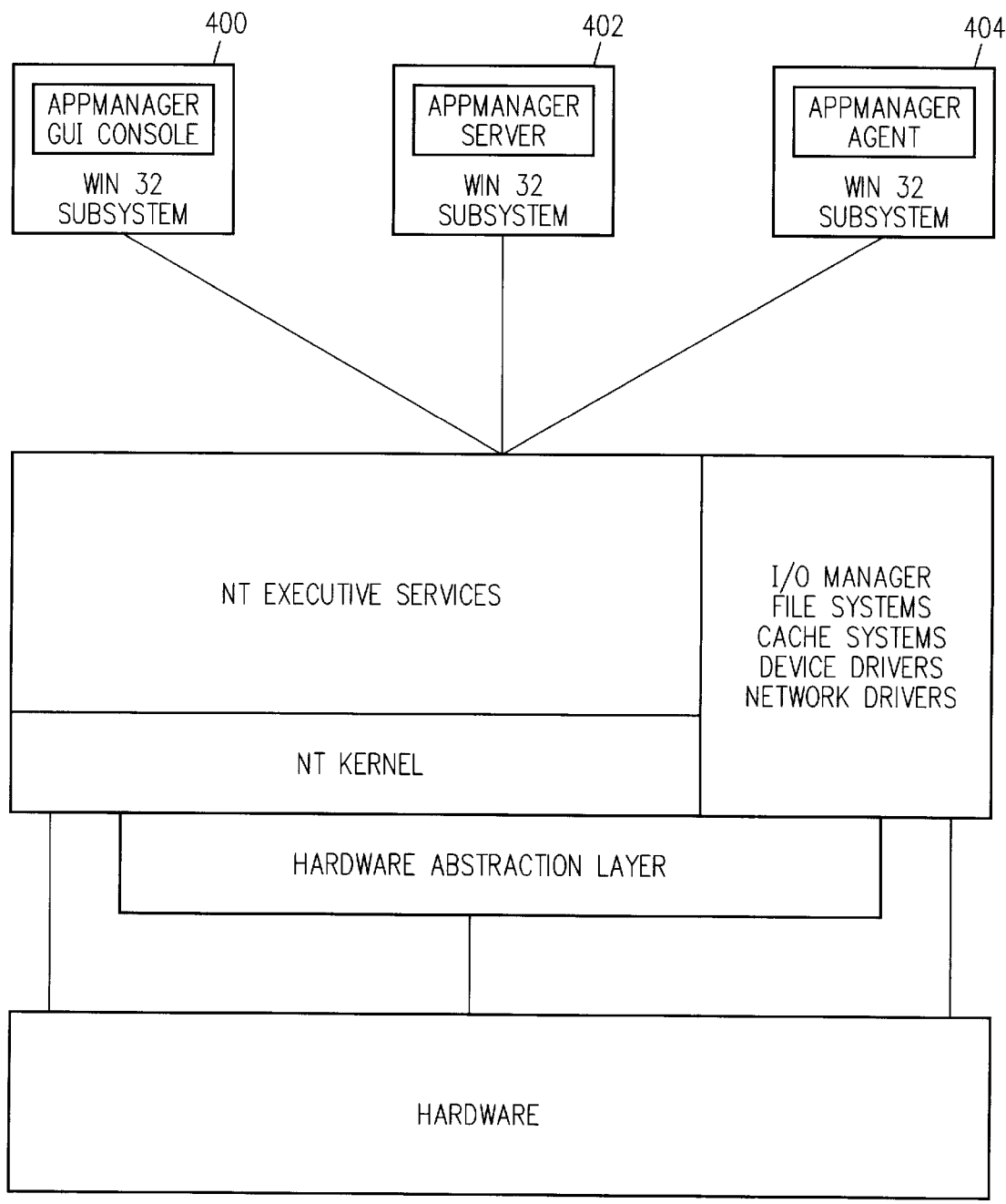
FIG. 15 is a block diagram of an operating system according to one embodiment of the present invention.

A system management system according to the present invention can be implemented as an application program on a distributed system running under the Windows NT® operating system, as shown in FIG. 15. For example, such a system management system allows the operator to manage computer resources and various subsystems (such as database servers, e-mail servers, and internet servers) distributed on multiple machines running the Windows NT® operating system.

FIG. 15 illustrates the structure of the Windows NT® operating system. AppManager™ is implemented as three types of application programs, AppManager™ GUI Console 400, AppManager™ Server 402 and AppManager™ Agent 404 running under the Win32 subsystem of the Windows NT® operating system. The AppManager™ GUI Console is a program that runs on the system administrator console and allows the system administrator to centrally define and control the execution of all programs, as described in the present application. The AppManager™ Server is a program that runs on a Windows NT® server that manages the database of system management information and the communications between the AppManager™ GUI and the AppManager™ Agents. The AppManager™ Agents are application programs that run on any Windows NT® server or workstation that receive requests from the AppManager™ GUI Console to run programs. All AppManager™ products are available from NetIQ, Corp. of Santa Clara, Calif.

Although particular embodiments of the present invention have been shown and described, it will be obvious to those skilled in the art that changes and modifications may be made without departing from this invention in its broader aspects and, therefore, the appended claims are to encompass within their scope all such changes and modifications that fall within the true spirit and scope of this invention.

What is claimed is:

1. A method for updating data objects stored in a storage of a client with data objects of a database stored in a server, the method comprising:

the client providing a last update time to the server, wherein the last update time indicates a last time at which the client received an update from the server; and the server providing a plurality of data objects stored in the database to the client, a value of the data objects having been updated in the database at a time later than the last update time.

2. The method of claim 1, wherein the server providing a plurality of data objects further comprises:

sorting the data objects based on a modification time of each data object, wherein the modification time is an integral value of each data object that indicates a last time at which a value of the data object was modified in the database.

3. The method of claim 2 further comprising:

the client setting the last update time equal to the modification time of the last data object provided by the server.

4. The method of claim 2, wherein the client providing a last update time further comprises:

providing a last update time of a set of data objects to the server, wherein the last update time of the set of data objects indicates the last time at which the client received an update of any data object of the set of data objects from the server.

5. The method of claim 4, wherein the server providing a plurality of data objects further comprises:

providing a plurality of data objects of the set of data objects stored in the database to the client, a value of the data objects having been updated in the database at a time later than the last update time of the set of data objects.

6. The method of claim 5 further comprising:

the client setting the last update time of the set of data objects equal to the modification time of the last data object provided by the server.

7. The method of claim 4, wherein the server providing a plurality of data objects further comprises:

maintaining a set modification time for the set of data objects, wherein the set modification time indicates a last time at which a value of any data object in the set of data objects was modified in the database; and determining whether the set modification time is greater than the last update time of the set of data objects.

8. The method of claim 1 further comprising:

the client determining whether a data object provided by the server was deleted from the database; and the client deleting a corresponding data object from the storage if the data object was deleted from the database.

9. An apparatus comprising a client having a storage, a server having a database, a network coupling the client to the server, and executable programs comprising:

an executable program on the client for providing a last update time to the server, wherein the last update time indicates a last time at which the client received an update from the server; and an executable program on the server for maintaining a modification time for each data object in the database, wherein the modification time is an integral value of each data object that indicates a last time at which a value of the data object was modified in the database, and for providing a plurality of data objects stored in the database to the client, each of the plurality of data objects having a modification time greater than the last update time.

10. The apparatus of claim 9, wherein the executable program on the server further comprises:

sorting the data objects based on the modification time of each data object.

11. The apparatus of claim 10, wherein the executable program on the client further comprises:

setting the last update time equal to the modification time of the last data object provided by the server.

12. The apparatus of claim 10, wherein the executable program on the client further comprises:

providing a last update time of a set of data objects to the server, wherein the last update time of a set of data objects indicates the last time at which the client received an update of the set of data objects from the server.

13. The apparatus of claim 12, wherein the executable program on the server further comprises:

providing a plurality of data objects of the set of data objects stored in the database to the client, a value of the data objects having been updated in the database at a time later than the last update time of the set of data objects.

14. The apparatus of claim 13, wherein the executable program on the client further comprises:

setting the last update time of the set of data objects equal to the modification time of the last data object provided by the server.

15. The apparatus of claim 12, wherein the executable program on the server further comprises:

maintaining a set modification time for a set of data objects, wherein the set modification time indicates the last time at which a value of any data object in the set of data objects was modified in the database; and determining whether the set modification time is greater than the last update time of the set of data objects.

16. The apparatus of claim 9, wherein the executable program on the client further comprises:

determining whether a data object provided by the server was deleted from the database; and deleting the corresponding data object from the storage if the data object was deleted from the database.

17. A computer-readable storage medium storing software executable by a computer system, the software including instructions for:

providing a last update time stored in a storage of a client to a server, wherein the last update time indicates the last time at which the client received an update of the storage with data objects of a database stored in the server; and providing a plurality of data objects stored in the database to the client, a value of the data objects having been modified in the database at a time later than the last update time.

18. The computer-readable storage medium of claim 17, wherein the providing a plurality of data objects stored in the database to the client further includes instructions for:

sorting the data objects based on a modification time of each data object, wherein the modification time is an integral value of each data object that indicates a last time at which a value of the data object was modified in the database.

19. The computer-readable storage medium of claim 18 further including instructions for:

setting the last update time equal to the modification time of the last data object provided by the server.

20. The computer-readable storage medium of claim 17 further including instructions for:

maintaining in the database a set modification time for a set of data objects, wherein the set modification time indicates the last time at which a value of any data object in the set of data objects was modified in the database; and determining whether the set modification time is greater than the last update time of the set of data objects.

21. The computer-readable medium of claim 17 further including instructions for:

determining whether a data object provided by the server was deleted from the database; and deleting the corresponding data object from the storage if the data object was deleted from the database.

22. The computer-readable medium of claim 17 further including instructions for:

managing a distributed system and monitoring the performance of the distributed system.

\* \* \* \* \*